(12) United States Patent
Yadav-Ranjan

(10) Patent No.: US 8,744,963 B1
(45) Date of Patent: *Jun. 3, 2014

(54) METHOD FOR TRANSFERRING AN AMOUNT TO BE PAID

(71) Applicant: Rani K. Yadav-Ranjan, San Jose, CA (US)

(72) Inventor: Rani K. Yadav-Ranjan, San Jose, CA (US)

(73) Assignee: Purple Leaf, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/691,312

(22) Filed: Nov. 30, 2012

Related U.S. Application Data

(63) Continuation of application No. 13/214,163, filed on Aug. 20, 2011, which is a continuation of application No. 12/576,147, filed on Oct. 8, 2009, now Pat. No. 8,027,913, which is a continuation of application No. 09/721,728, filed on Nov. 25, 2000, now Pat. No. 7,603,311.

(60) Provisional application No. 60/167,938, filed on Nov. 29, 1999, provisional application No. 60/170,829, filed on Dec. 14, 1999, provisional application No. 60/174,123, filed on Dec. 31, 1999, provisional application No. 60/174,124, filed on Dec. 31, 1999, provisional application No. 60/199,910, filed on Apr. 26, 2000.

(51) Int. Cl.
*G06Q 40/00* (2012.01)

(52) U.S. Cl.
USPC .................................. 705/40; 705/35; 705/39

(58) Field of Classification Search
USPC ................................................ 705/35, 39, 40
See application file for complete search history.

(56) References Cited

U.S. PATENT DOCUMENTS

| | | | |
|---|---|---|---|
| 3,842,248 A | 10/1974 | Yarnell et al. | |
| 3,852,571 A | 12/1974 | Hall et al. | |
| 4,485,300 A | 11/1984 | Peirce | |
| 4,601,011 A | 7/1986 | Grynberg | |
| 4,614,861 A | 9/1986 | Pavlov et al. | |
| 4,701,601 A | 10/1987 | Francini et al. | |
| 4,707,592 A | 11/1987 | Ware | |

(Continued)

FOREIGN PATENT DOCUMENTS

| | | |
|---|---|---|
| EP | 0172670 | 2/1986 |
| EP | 0338568 | 8/1993 |

(Continued)

OTHER PUBLICATIONS

Bellare et al., "VarietyCash: a Multi-purpose Electronic Payment System," Proceedings of the 3rd Usenix Workshop on Electronic Commerce, 1998.

(Continued)

*Primary Examiner* — Lalita M Hamilton
(74) *Attorney, Agent, or Firm* — Lee & Hayes, PLLC

(57) ABSTRACT

A method for transferring an amount to be paid is provided. The method includes searching for available wireless devices and selecting a payee via input provided through one of the available wireless devices. The method includes selecting a payment option for transferring a payment amount to the payee and entering the payment amount. The method includes authorizing payment instructions to the payee and receiving confirmation that the payment amount was received by the payee.

17 Claims, 6 Drawing Sheets

(56) References Cited

U.S. PATENT DOCUMENTS

| | | |
|---|---|---|
| 4,734,564 A | 3/1988 | Boston et al. |
| 4,755,940 A | 7/1988 | Brachtl et al. |
| 4,799,156 A | 1/1989 | Shavit et al. |
| 4,823,264 A | 4/1989 | Deming |
| 4,839,504 A | 6/1989 | Nakano |
| 4,893,248 A | 1/1990 | Pitts et al. |
| 4,905,826 A | 3/1990 | Martin |
| 4,947,028 A | 8/1990 | Gorog |
| 4,948,174 A | 8/1990 | Thomson et al. |
| 4,949,272 A | 8/1990 | Vanourek et al. |
| 4,979,207 A | 12/1990 | Baum et al. |
| 4,992,940 A | 2/1991 | Dworkin |
| 5,027,338 A | 6/1991 | Ata |
| 5,121,945 A | 6/1992 | Thomson et al. |
| 5,197,094 A | 3/1993 | Tillery et al. |
| 5,206,488 A | 4/1993 | Teicher |
| 5,220,501 A | 6/1993 | Lawlor et al. |
| 5,223,699 A | 6/1993 | Flynn et al. |
| 5,229,584 A | 7/1993 | Erickson |
| 5,265,033 A | 11/1993 | Vajk et al. |
| 5,283,829 A | 2/1994 | Anderson |
| 5,287,270 A | 2/1994 | Hardy et al. |
| 5,325,290 A | 6/1994 | Cauffman et al. |
| 5,326,959 A | 7/1994 | Perazza |
| 5,336,870 A | 8/1994 | Hughes et al. |
| 5,383,113 A | 1/1995 | Kight et al. |
| 5,402,336 A | 3/1995 | Spiegelhoff et al. |
| 5,420,405 A | 5/1995 | Chasek |
| 5,420,926 A | 5/1995 | Low et al. |
| 5,424,938 A | 6/1995 | Wagner et al. |
| 5,426,281 A | 6/1995 | Abecassis |
| 5,465,206 A | 11/1995 | Hilt et al. |
| 5,477,038 A | 12/1995 | Levine et al. |
| 5,483,445 A | 1/1996 | Pickering |
| 5,485,510 A | 1/1996 | Colbert |
| 5,496,991 A | 3/1996 | Delfer, III et al. |
| 5,508,817 A | 4/1996 | Kunigami |
| 5,524,073 A | 6/1996 | Stambler |
| 5,532,920 A | 7/1996 | Hartrick et al. |
| 5,557,518 A | 9/1996 | Rosen |
| 5,570,465 A | 10/1996 | Tsakanikas |
| 5,590,197 A | 12/1996 | Chen et al. |
| 5,621,797 A | 4/1997 | Rosen |
| 5,629,980 A | 5/1997 | Stefik et al. |
| 5,634,012 A | 5/1997 | Stefik et al. |
| 5,638,443 A | 6/1997 | Stefik et al. |
| 5,644,727 A | 7/1997 | Atkins |
| 5,649,117 A | 7/1997 | Landry |
| 5,652,786 A | 7/1997 | Rogers |
| 5,655,089 A | 8/1997 | Bucci |
| 5,671,279 A | 9/1997 | Elgamal |
| 5,671,280 A | 9/1997 | Rosen |
| 5,677,955 A | 10/1997 | Doggett et al. |
| 5,684,965 A | 11/1997 | Pickering |
| 5,689,565 A | 11/1997 | Spies et al. |
| 5,699,528 A | 12/1997 | Hogan |
| 5,708,422 A | 1/1998 | Blonder et al. |
| 5,710,887 A | 1/1998 | Chelliah et al. |
| 5,715,314 A | 2/1998 | Payne et al. |
| 5,724,424 A | 3/1998 | Gifford |
| 5,727,249 A | 3/1998 | Pollin |
| 5,732,400 A | 3/1998 | Mandler et al. |
| 5,757,917 A | 5/1998 | Rose et al. |
| 5,774,670 A | 6/1998 | Montulli |
| 5,778,173 A | 7/1998 | Apte |
| 5,790,677 A | 8/1998 | Fox et al. |
| 5,793,028 A | 8/1998 | Wagener et al. |
| 5,793,302 A | 8/1998 | Stambler |
| 5,809,143 A | 9/1998 | Hughes |
| 5,809,144 A | 9/1998 | Sirbu et al. |
| 5,812,668 A | 9/1998 | Weber |
| 5,815,665 A | 9/1998 | Teper et al. |
| 5,822,737 A | 10/1998 | Ogram |
| 5,825,881 A | 10/1998 | Colvin, Sr. |
| 5,825,890 A | 10/1998 | Elgamal et al. |
| 5,826,241 A | 10/1998 | Stein et al. |
| 5,826,245 A | 10/1998 | Sandberg/Diment |
| 5,832,460 A | 11/1998 | Bednar et al. |
| 5,845,070 A | 12/1998 | Ikudome |
| 5,850,446 A | 12/1998 | Berger et al. |
| 5,857,152 A | 1/1999 | Everett |
| 5,870,473 A | 2/1999 | Boesch et al. |
| 5,878,141 A | 3/1999 | Daly et al. |
| 5,880,446 A | 3/1999 | Mori et al. |
| 5,884,288 A | 3/1999 | Chang et al. |
| 5,890,137 A | 3/1999 | Koreeda |
| 5,903,721 A | 5/1999 | Sixtus |
| 5,915,022 A | 6/1999 | Robinson et al. |
| 5,920,847 A | 7/1999 | Kolling et al. |
| 5,949,044 A | 9/1999 | Walker et al. |
| 5,956,700 A | 9/1999 | Landry |
| 5,963,917 A | 10/1999 | Ogram |
| 5,978,840 A | 11/1999 | Nguyen et al. |
| 5,983,208 A | 11/1999 | Haller et al. |
| 5,991,738 A | 11/1999 | Ogram |
| 6,012,144 A | 1/2000 | Pickett |
| 6,016,484 A | 1/2000 | Williams et al. |
| 6,021,399 A | 2/2000 | Demers et al. |
| 6,029,150 A | 2/2000 | Kravitz |
| 6,029,151 A | 2/2000 | Nikander |
| 6,044,362 A | 3/2000 | Neely |
| 6,049,786 A | 4/2000 | Smorodinsky |
| 6,070,150 A | 5/2000 | Remington et al. |
| 6,078,907 A | 6/2000 | Lamm |
| 6,081,790 A | 6/2000 | Rosen |
| 6,088,683 A | 7/2000 | Jalili |
| 6,128,603 A | 10/2000 | Dent et al. |
| 6,173,272 B1 | 1/2001 | Thomas et al. |
| 6,192,380 B1 | 2/2001 | Light et al. |
| 6,285,991 B1 | 9/2001 | Powar |
| 6,304,857 B1 | 10/2001 | Heindel et al. |
| 6,304,860 B1 | 10/2001 | Martin, Jr. et al. |
| 6,317,729 B1 | 11/2001 | Camp et al. |
| 6,578,015 B1 | 6/2003 | Haseltine et al. |
| 6,594,692 B1 | 7/2003 | Reisman |
| 6,678,664 B1 | 1/2004 | Ganesan |
| 6,834,271 B1 | 12/2004 | Hodgson et al. |
| 6,999,936 B2 | 2/2006 | Sehr |
| 7,308,426 B1 | 12/2007 | Pitroda |
| 7,792,749 B2 | 9/2010 | Ganesan |
| 7,930,213 B1 | 4/2011 | Philyaw et al. |
| 2001/0018660 A1* | 8/2001 | Sehr .................................. 705/5 |
| 2002/0059139 A1 | 5/2002 | Evans |
| 2005/0102231 A1* | 5/2005 | Remington et al. ............ 705/40 |
| 2009/0030842 A1* | 1/2009 | Hoffman et al. ................ 705/66 |

FOREIGN PATENT DOCUMENTS

| | | |
|---|---|---|
| EP | 0256768 | 3/1994 |
| EP | 0363122 | 12/1994 |
| EP | 0745947 | 12/1996 |
| EP | 0745961 | 12/1996 |
| EP | 0256768 | 12/2001 |
| GB | 2066540 | 7/1981 |
| WO | WO 82/03018 | 9/1982 |
| WO | WO 91/16691 | 10/1991 |
| WO | WO 93/08545 | 4/1993 |
| WO | WO 96/08783 | 3/1996 |
| WO | WO 97/24680 | 7/1997 |
| WO | WO9745814 A1 | 12/1997 |
| WO | WO 98/40809 | 9/1998 |
| WO | WO9905628 A1 | 2/1999 |
| WO | WO9913421 A2 | 3/1999 |

OTHER PUBLICATIONS

Cox et al., "NetBill Security and Transaction Protocol," Proceedings of the 1st Usenix Workshop on Electronic Commerce, Jul. 1995, pp. 77-88.

Medvinsky et al., "NetCash: A design for practical electronic currency on the Internet," Information Sciences Institute, University of Southern California, Nov. 1993.

(56) References Cited

OTHER PUBLICATIONS

"Interchange Message Specification for Debit and Credit Card Message Exchange Among Financial Institutions," ANSI X9.2, The X9 Secretariat, American Bankers Association, May 16, 1988.

Vartabedian, Your Wheels; Court System Congestion Snarls Traffic-Ticket Process, Los Angeles Times, Aug. 5, 1999.

"You've got e/bill!; Bank one First to Fully Integrate Electronic Bill Delivery Through Integrion." Publication: Business Wire.

iKP/ A Family of Secure Electronic Payment Protocols "working draft".

Internet Keyed Payments Protocol "Internet/Draft" of the Internet Engineering Task Force (IETF), M. Linehan; G. Tsudik, IBM Research.

Ralph N. Kleps Award 1991 Nominations Long Beach Municipal Auto Clerk: Traffic and Small Claims Automated Filing and Payment (AFP) Kiosks.

Ralph N. Kleps Award 1992 Nomination Form Los Angeles Municipal Court Traffic Interactive Payment System.

LexisNexis Municipal Services Now Include a Web Presence.

Digest of Papers, Compcon '95, Technologies for the Information Superhighway Payment Switches for Open Networks.

LexisNexis State to Increase "Info" for Kiosks Up to 25 Machines Could Be in Use by End of the Year State to Add Six More Kiosks, Tony Semerad, The Salt Lake tribune.

www.speedingticket.net Just in Time for Labor Day Holiday Traffic.

Visa International Secure Transaction technology Specifications.

Web Site for Paying Traffic Fines Lauded, Daily News (Los Angeles), Troy Anderson.

Secure Electronic Transaction (SET) Specification Book 1: Business Description Visa and MasterCard (Draft for Public Comment).

Secure Electronic Transaction (SET) Specification Book 2: Technical Specifications Visa and MasterCard (Draft for Public Comment).

HeinOnline, The Judges Journal, ATMS Bring the Court to You, Weiss and Weaver.

SNPP: A Simple Network Payment Protocol, Semyon Dukach/ M.I.T. Laboratory for Computer Science.

Policy Studies, Legal Analysis for a Banking Industry Online Identity and Attribute Authentication Service, Sep. 2000 (EPS/2000/2).

Article on Two Proposals for on/Line Bankcard Payments using Open Networks: Problems and Solutions, Wenbo Mao, Hewlett/Packard Laboratories.

\* cited by examiner

METHOD FOR TRANSFERRING AN AMOUNT TO BE PAID

RELATED APPLICATIONS/PRIORITY CLAIMS

This application is a continuation of (and claims priority under 35 USC 120 to) U.S. patent application Ser. No. 13/214,163 filed on Aug. 20, 2011 entitled "Process and Method for Conducting Electronic Transactions Using Wireless and Cellular Devices" which is a continuation of patent application Ser. No. 12/576,147 filed on Oct. 8, 2009 and entitled "Process and Device for Conducting Electronic Transactions" which in turn claims priority of patent application Ser. No. 09/721,728 filed on Nov. 25, 2000 and entitled "Process and Device for Conducting Electronic Transactions" which in turn claims priority from Provisional Application Ser. Nos. 60/170,829 filed Dec. 14, 1999, entitled "System and process of conducting transactions associated with parking tickets or parking citations using the Internet and e-commerce," 60/167,938 filed Nov. 29, 1999, entitled "System and process of conducting transactions associated with traffic tickets or citations using the Internet and e-commerce," 60/174,123 filed Dec. 31, 1999, entitled "System and process of conducting transactions associated with Emergency vehicles or Police Administrative Citation using the Internet and e-commerce," 60/174,124 filed Dec. 31, 1999, entitled "System and process of conducting transactions associated with Court Tickets, Court Warrant or Court Citations using the Internet and E-commerce," 60/199,910 filed Apr. 26, 2000, entitled "A system and process of conducting transactions associated with city or county utilities (water, sewer, property tax, and/or Garbage) using the internet and e-Commerce," the entire disclosures of which are hereby incorporated herein by reference.

FIELD

This disclosure relates to a process and a device for conducting electronic transactions.

BACKGROUND

Currently, a Police Administration Citation or Police Administration Ticket is issued to the individual committing the offense who is found to be guilty by the Judicial Department. This would involve the collection of all expenses for the dispatch of Emergency Vehicles, incurred during the course of the incident. A copy of the Police Administration Citation or Police Administration Ticket is entered into the Judicial Department Database manually or from an Electronic Hand held Police Administration Citation issuing device. The individual has the opportunity to pay the Police Administration Citation/ticket by mail with a check, cashiers check or in person with cash within 21 days from the date of the issuance. If no payment has been made, there may be penalties incurred after this time. Once the grace period has run out the, incurred amount is then added to the local Department of Motor Vehicle's registration procedure, also there may be a hold placed on the vehicle registration until the new amount (original+penalties) is paid. This process is very cumbersome.

Currently, the Citation is issued to the individual committing the offense and a copy is entered into the Police Department Database manually. After approximately 45 days the citation is transferred to the Court of County Clerks office, where a warrant is issued and another 15 day grace period begins. The individual has the opportunity pay the citation by mail with a check, cash or cashiers check within the original 45 days or in person during the 15 day grace period. There may be penalties incurred during this time. Once the warrant is issued the individual will then have to appear in front of the Presiding Judge and make arrangements for payment. This may include time-triggered payments or automatic payroll deductions. This process is very cumbersome.

Currently, a Citation is issued to the individual committing the offense who can be found to be guilty or not guilty by the Judicial Department. This would involve the collection of all expenses incurred during the course of the incident/accident. Currently a copy of the citation, warrant or ticket is entered into the Judicial Department Database manually. The individual has the opportunity to pay the citation, warrant or ticket by mail with a check, cashiers check or in person with cash within 21 days from the date of the issuance. They also have the option to plead Guilty (and pay the fine issued, set up a court date) or Non-Guilty (and pay the fine and set up a court date) or they can simply pay the fine. If no payment has been made, there may be penalties incurred after this time. Once the grace period has run out the, local Police Department are ordered to find the individual and arrest them. There also may be a hold placed on their bank accounts to secure the amount necessary to satisfy the fine. This process is very cumbersome.

Currently, a Citation is issued to the individual committing the offense and a copy is entered into the Judicial Department Database manually or from an Electronic Hand held citation-issuing device. The individual has the opportunity pay the citation/ticket by mail with a check, a cashiers check or in person with cash within 21 days from the date of the issuance or sign-up for a educational course through the Police Department. If no payment has been made, there may be penalties incurred after this time. Once the grace period has run out the, incurred amount is then added to the local Department of Motor Vehicle's registration procedure, also there may be a hold placed on the vehicle registration until the new amount (original+penalties) is paid. This process is very cumbersome.

Currently, a Utility: water and garbage entity issues a bill to a individual or business. This would involve the collection of funds for the dispatch of Utilities (Water and/or Garbage), incurred during the course of a specified time period. Currently a copy of the Utilities (Water and/or Garbage) is entered into the City/county Database manually. The individual has the opportunity to pay the bill by mail with a check; a cashier's check or in person with cash within 30 days from the date of the invoice. If no payment has been made, there may be penalties incurred after this time. Once the grace period has run out the, incurred amount is then added to the previous months. After 3 months the City may issue a lien on the property in question until the new amount (original+penalties) is paid. This process is very cumbersome.

SUMMARY

In one embodiment, this invention deals with Police Administration Citations/Bill or Police Administration Ticket violations for illegal non-moving violation per the rules set by the City, County, State, Township or local government. This invention provides a simpler and more efficient way to pay the Emergency Vehicle, Police Administration Ticket or Police Administration Citation using the Internet. Thus, in one embodiment, this invention provides a cost-effective means of collecting revenue from Police Administration Police Administration Citation and/or Violations using the Internet.

In one embodiment, this invention relates to a system to enable one to pay a traffic Violation Ticket or Citation via the Internet. The system involves a Web Browser who access the Corporate in-house Server in real-time which collects the necessary information and then interacts with the Corporate database for retrieval of vital information and amount balances to satisfy the payment of a Citation or Traffic ticket. This information is then confirmed and used to contact Banks and other Financial Institutions for payment of the Citation or Traffic Violation.

The Corporate database is updated in Real-time with all necessary information to satisfy the Citation or Traffic Violation. The Funds are transferred into the Corporate Bank and a validation voucher is issued via E-mail to the customer and Corporate notifying of this transaction. This invention deals with Traffic Citations or Traffic ticket violations for speeding or any other moving violation per the rules set by the City, County or local government. Thus this invention provides a cost-effective means of collecting revenue from Traffic Citations and/or Violations using the Internet.

In one embodiment, this invention relates to a system to enable one to pay a Court Ticket, Court Warrant or Court Citation via the Internet. The system involves a Web Browser who access the Corporate in-house Server in real-time which collects the necessary information and then interacts with the Corporate database for retrieval of vital information and amount balances to satisfy the payment of the Citation, Warrant or Ticket. This information is then confirmed and used to contact Banks and other Financial Institutions for payment of the Citation, Warrant or Ticket. The Corporate database is updated in Real-time with all necessary information to satisfy the Citation, Warrant or Ticket. The Funds are transferred into the Corporate Bank and a validation voucher is issued via E-mail to the customer and Corporate notifying of this transaction. In one embodiment, this invention deals with Court Citations; Court Warrant or Court Ticket violations for illegal non-moving violation per the rules set by the County, Township, State or local government. This invention provides a simpler and more efficient way to pay the Court Citation, Court Ticket or Court Warrant using the Internet. Thus this invention provides a cost-effective means of collecting revenue from Court Ticket, Court Citations, Court Warrant using the Internet.

In one embodiment, this invention relates to a system to enable one to pay a Parking Violation Ticket or Citation via the Internet. The system involves a Web Browser who access the Corporate in-house Server in real-time which collects the necessary information and then interacts with the Corporate database for retrieval of vital information and amount balances to satisfy the payment of the Citation or Parking Tickets. This information is then confirmed and used to contact Banks and other Financial Institutions for payment of the Citation or Parking Violation. The Corporate database is updated in Real-time with all necessary information to satisfy the Citation or Parking Violation. The Funds are transferred into the Corporate Bank and a validation voucher is issued via E-mail to the customer and Corporate notifying of this transaction. This invention deals with Parking Citations or Parking Ticket violations for Illegal non-moving violation per the rules set by the City, Township or local government. In one embodiment, this invention provides a simpler and more efficient way to pay the Parking Tickets or Citation using the Internet. Thus this invention provides a cost-effective means of collecting revenue from Parking Citations and/or Violations using the Internet.

In one embodiment, this invention relates to a system to enable one to pay a Utility (Water/Garbage) Invoice via the Internet. The system involves a Web Browser which access the Corporate in-house Server in real-time which collects the necessary information and then interacts with the Corporate database for retrieval of vital information and amount balances to satisfy the payment of the Invoice for Utilities (Water and/or Garbage). This information is then confirmed and used to contact Banks and other Financial Institutions for payment of the Invoice.

The Corporate database is update with all necessary information to satisfy the Invoice. The Funds are transferred into the Corporate Bank and a validation voucher is issued via E-mail to the customer and Corporate notifying of this transaction. This invention deals with Utilities (Water and/or Garbage) for City, County, State, Township or local government. In one embodiment, this invention provides a simpler and more efficient way to pay the Utilities (Water and/or Garbage) using the Internet. Thus this invention provides a cost-effective means of collecting revenue from the customers using the Internet.

One embodiment of this invention relates to a process for conducting a transaction using a medium, comprising generating a receipt and a payment remittance information; enabling an entity to authorize a payment due on the receipt; and associating the payment with the payment remittance information; wherein the payment remittance information is arranged within a data structure according to a prescribed format, the data structure comprising one or more open data fields to hold data that the entity can enter, and the payment remittance information further comprises a structured remittance data that is kept hidden from the entity.

Another embodiment relates to process of executing computer-executable instructions using a medium, comprising storing a receipt and a payment remittance information, the payment remittance information comprising a structured remittance data that is kept hidden from an entity; presenting the receipt to the entity without revealing the structured remittance data; enabling the entity to specify payment instructions comprising at least an amount to be paid on the receipt and an account at a payor from which to draw the amount while prohibiting the entity from altering data contained in the structured remittance data; associating the payment instructions with the structured remittance data; transmitting the payment instructions to the payor to initiate payment of the amount; and routing the amount to a payee.

Another embodiment relates to a device, comprising means for generating a receipt and a payment remittance information; means for enabling an entity to authorize a payment due on the receipt; and means for associating the payment with the payment remittance information; wherein the device conducts a transaction using a medium, and wherein the payment remittance information is arranged within a data structure according to a prescribed format, the data structure comprising one or more open data fields to hold data that the entity can enter, and the payment remittance information further comprises a structured remittance data that is kept hidden from the entity.

Still another embodiment relates to a device, comprising means for storing a receipt and a payment remittance information, the payment remittance information comprising a structured remittance data that is kept hidden from an entity; means for presenting the receipt to the entity without revealing the structured remittance data; means for enabling the entity to specify payment instructions comprising at least an amount to be paid on the receipt and an account at a payor from which to draw the amount while prohibiting the entity from altering data contained in the structured remittance data; means for associating the payment instructions with the structured remittance data; means for transmitting the payment instructions to the payor to initiate payment of the amount; and means for routing the amount to a payee.

The receipt is selected from the group consisting of a traffic ticket, a citation, a utility bill, a court ticket, a court warrant, hospital receipt, a rental receipt, a property tax receipt, a property transfer tax receipt, a business permits receipt, a business license receipt, a business license renewal receipt, an administrative citation receipt, a facility rental receipt, a class sign-up receipt, a building permit receipt, a planning permit receipt, an airport use receipt, a roads and highway receipt, a fire department receipt, a waste disposal receipt, a recycling waste bill, a marriage license receipt, a birth certificate receipt, a death certificate receipt, a lien receipt, a passport application receipt, a passport renewal receipt, a visa application receipt, a visa renewal receipt, a land development maps receipt, an United States Geological Service Maps Division receipt, an Internal Revenue Service receipt, a State Tax Board receipt, a Driver's license renewal receipt, a Vehicle License tags renewal receipt, a car insurance receipt, an electric bill, a phone bill, a gas bill, a water receipt, a business tax receipt and a parking ticket.

The medium or device is selected from the group consisting of a computer, a cellular telephone, a portal, a network, Internet, smart cards, a wireless access device, smart crystals, hand-held display screens, fiber optics, digital optical readers, digital print readers, a broadband network, a DVD-ROM, a CD-RW, a telecommunication line cord, a bio-crystal network, bar codes, data crystals, artificial intelligence, laser scanners and computer-executable instructions.

The entity is selected from the group consisting of a citizen, a business, an institution, an agency and a university. The payor is selected from the group consisting of a bank, an entity and a credit card facility. The payee is selected from the group consisting of an intermediary, a government agency, a government department, a business, citizens and a collection agency.

In some embodiments a method for transferring an amount to be paid is provided. The method includes searching for available wireless devices and selecting a payee via input provided through one of the available wireless devices. The method includes selecting a payment option for transferring a payment amount to the payee and entering the payment amount. The method includes authorizing payment instructions to the payee and receiving confirmation that the payment amount was received by the payee.

DETAILED DESCRIPTION

Figure 6:
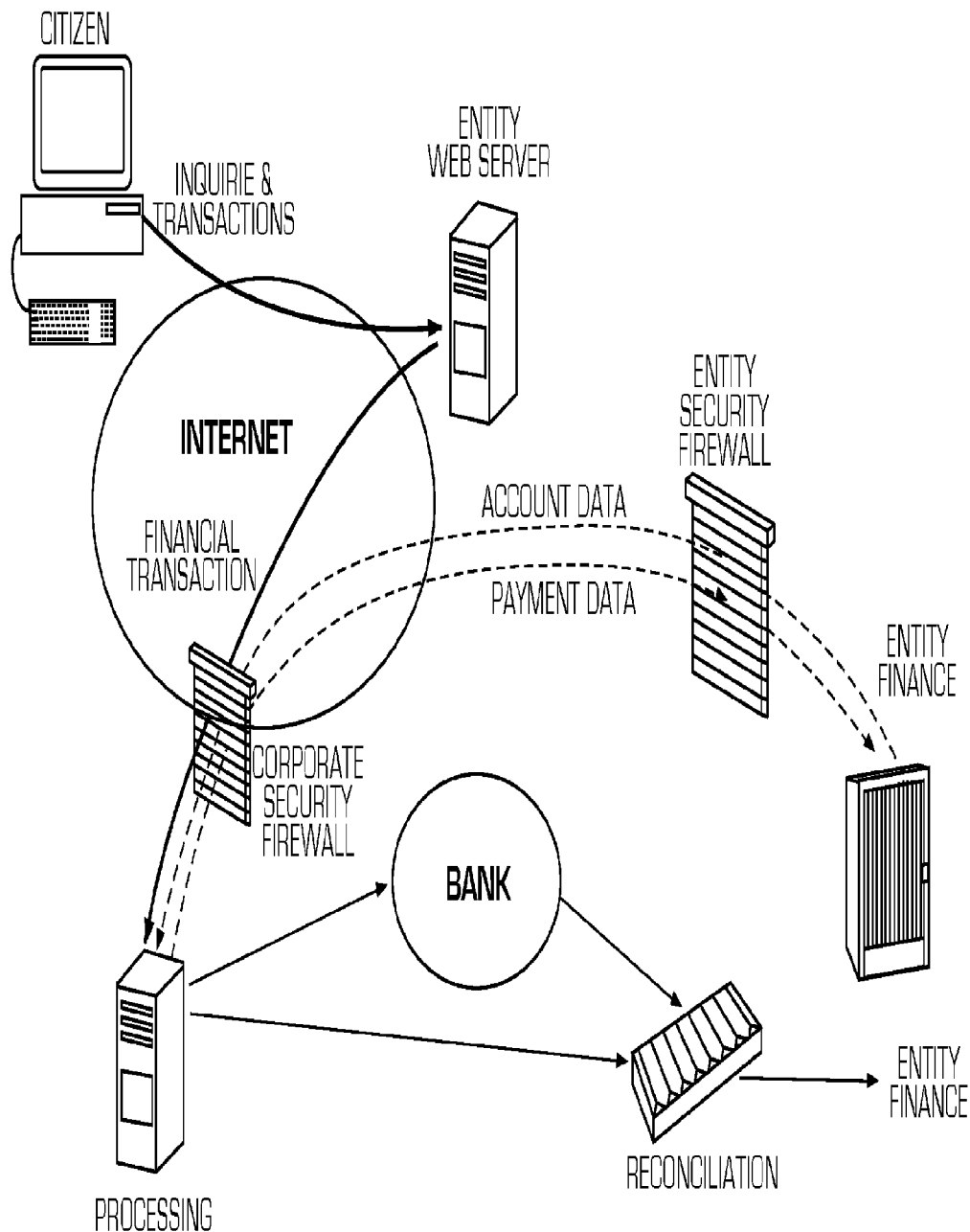
FIG. 6 schematically shows a three-tier system architecture layout for an entity hardware and software design process of conducting transactions using the Internet and E-Commerce.

FIG. 6 schematically shows an overview of a three-tier system architecture layout for an entity hardware and software design process of conducting transactions, for example associated with Utilities, using the Internet and E-Commerce. Different preferred embodiments of this invention are described below.

In one embodiment, this invention relates to a system to enable one to pay a Police Administration Ticket or Police Administration Citation via the Internet. The system involves a Web Browser who access the Corporate in-house Server in real-time which collects the necessary information and then interacts with the Corporate database for retrieval of vital information and amount balances to satisfy the payment of the Police Administration Citation or Emergency Vehicles. This information is then confirmed and used to contact Banks and other Financial Institutions for payment of the Police Administration Citation or Police Administrative Violation. The Corporate database is update with all necessary information to satisfy the Police Administration Citation or Police Administrative Violation. The Funds are transferred into the Corporate Bank and a validation voucher is issued via E-mail to the customer and Corporate notifying of this transaction. This invention relates to a system, which allows one to pay Police Administration ticket or Police Administration Citation via the Internet in a very convenient manner. This is expected to help the local Police Administration office or City, County, State, Judicial Department in collecting the funds in a more timely manner, allowing the payee to continue to be a good citizen, and possibly be able to track the payments with less number of staffs.

In one embodiment, this invention involves the payment of a Police Administration Ticket or Police Administration Citation issued by a City, County, State, Judicial Department or Office of the Court Clerks to be paid over the Internet using E-commerce and TPA's (Trading Partner agreements), banks and Financial Institutions. This standard method for making payments will be replaced with Electronic Data Interchange (EDI) and Electronic Funds Transfer (EFT); this will be done in real-time. Their License Plate Number and necessary information would be updated to the Corporate database and the appropriate funds (retrieved from Corporate database) would have to be paid. Once the payment has been made The Office of the Court of Clerks, Justice department or City, County, State, County Judicial Department would then be notified of the payment and funds would be transferred into their bank account. The customer would receive a verification number that the process was completed successfully. If the payment is made during the original time period then no further action is warranted; however if the warrant is issued, then the Department of Motor Vehicle would also have to be notified of the satisfaction of debt. The system also connects multiple users across a variety of systems. This system enables the delivery of secure Internet payment capabilities to the Corporate of this service provider. Payment Manager enables ISP's (Internet Service providers), PPP's (Point-to-Point Protocol), SHTP's (Secure Hypertext Transfer Protocol), Banks and Financial Institutions to quickly and easily link the Customer to Corporation payment processors to handle the complex e-commerce transactions. The software integrates with virtually all business processes and applications, and works with multiple operating systems and databases using customized software for uploading and downloading of necessary information files.

In one embodiment, this invention relates to a system, which allows one to pay Traffic Violations ticket or Citation via the Internet in a very convenient manner. This is expected to help the local city police department in collecting the funds in a more timely manner, and possibly be able to track the payments with less number of staffs.

In one embodiment, this invention involves the payment of a Traffic Ticket or Traffic Citation issued by a City Police Department to be paid over the Internet using E-commerce, banks and Financial Institutions. This standard method for making payments will be replaced with Electronic Data Interchange (EDI) and Electronic Funds Transfer (EFT). This will be done in real-time. Once the payment has been made the City Police Department (Corporate) would then be notified of the payment and funds would be transferred into their bank account. The customer would receive a verification number that the process was completed successfully. The system also connects multiple users across a variety of systems. This system enables the delivery of secure Internet payment capabilities to the Corporate of this service provided.

Payment Manager enables ISP's, CSPs, Asp's, Banks and Financial Institutions to quickly and easily link the Customer to Corporation payment processors to handle today's complex e-commerce transactions. The software integrates with virtually all business processes and applications, and works with multiple operating systems and databases using customized software for uploading of necessary information files.

In one embodiment, this invention relates to a system, which allows one to pay Court Citation, Court Tickets, and Court Warrant via the Internet in a very convenient manner. This is expected to help the local Court of Clerks or City Judicial Department in collecting the funds in a more timely manner, allow the payee to continue to be a good citizen and be able to track the payments with less number of staffs.

In one embodiment, this invention involves the payment of a Court Ticket, Court Warrant or Court Citation issued by a City Judicial Department or Office of the Court of Clerks to be paid over the Internet using E-commerce and TPA's (Trading Partner agreements), banks and Financial Institutions. This standard method for making payments will be replaced with Electronic Data Interchange (EDI) and Electronic Funds Transfer (EFT), this will be done in real-time. Their name and necessary information would be updated to the Corporate database and the appropriate funds (retrieved from Corporate database) would have to be paid. Once the payment has been made The Office of Court of Clerks, City, County Department would then be notified of the payment and funds would be transferred into their bank account. The customer would receive a verification number that the process was completed successfully via e-mail.

The system also connects multiple users across a variety of systems. This system enables the delivery of secure Internet payment capabilities to the Corporate of this service provided.

Payment Manager enables ISP's (Internet Service providers), PPP's (Point-to-Point Protocol), SHTP's (Secure Hypertext Transfer Protocol), Banks and Financial Institutions to quickly and easily link the Customer to Corporation payment processors to handle the complex e-commerce transactions. The software integrates with virtually all business processes and applications, and works with multiple operating systems and databases using customized software for uploading and downloading of necessary information files.

In one embodiment, this invention relates to a system which allows one to pay Parking Violations ticket or Citation and sign-up for the drivers training school, via the Internet in a very convenient manner. This is expected to help the local Parking Violations office or City Judicial Department in collecting the funds in a more timely manner, and possibly be able to track the payments with less number of staffs.

In one embodiment, this invention involves the payment of a Parking Ticket or Parking Citation issued by a City Judicial Department or Office of Parking Violations to be paid over the Internet using E-commerce and TPA's (Trading Partner agreements), banks and Financial Institutions. This standard method for making payments will be replaced with Electronic Data Interchange (EDI) and Electronic Funds Transfer (EFT), this will be done in real-time. If the individual chooses to sign-up for the driver's training school, their name and necessary information would also be updated to the Corporate database and the appropriate funds (retrieved from Corporate database) would have to be paid. Once the payment has been made The Office of Parking Violations/City Judicial Department (Corporate) would then be notified of the payment and funds would be transferred into their bank account. The customer would receive a verification number that the process was completed successfully. The system also connects multiple users across a variety of systems. This system enables the delivery of secure Internet payment capabilities to the Corporate of this service provided. Payment Manager enables ISP's (Internet Service providers), PPP's (Point-to-Point Protocol), SHTP's (Secure Hypertext Transfer Protocol), Banks and Financial Institutions to quickly and easily link the Customer to Corporation payment processors to handle today's complex e-commerce transactions. The software integrates with virtually all business processes and applications, and works with multiple operating systems and databases using customized software for uploading and downloading of necessary information files.

In one embodiment, this invention relates to a system, which allows one to pay a Utility bill (Water/Garbage) via the Internet in a very convenient manner. This is expected to help the local City, County, State, Accounting Departments in collecting the funds in a more timely manner, allowing the payee to continue to be a good citizen, and possibly be able to track the payments with less number of staffs.

In one embodiment, this invention involves the payment of a Utilities (Water/Garbage) bill to be paid over the Internet using E-commerce and TPA's (Trading Partner agreements), banks and Financial Institutions. This standard method for making payments will be replaced with Electronic Data Interchange (EDI) and Electronic Funds Transfer (EFT), this will be done in real-time. The information would be updated to the Corporate database and the appropriate funds (retrieved from Corporate database) would have to be paid. Once the payment has been made The Office of the Finance Director or other appropriate official Department would then be notified of the payment and funds would be transferred into their bank account. The customer would receive a verification number that the process was completed successfully. If the payment is made during the original time period then no further action is warranted; however if the lien were issued, then the Office of Court of Clerks would also have to be notified of the satisfaction of debt. The system also connects multiple users across a variety of systems. This system enables the delivery of secure Internet payment capabilities to the Corporate of this service provider. Payment Manager enables ISP's (Internet Service providers), PPP's (Point-to-Point Protocol), SMTP's (Secure Hypertext Transfer Protocol), Banks and Financial Institutions to quickly and easily link the Customer to Corporation payment processors to handle the complex e-commerce transactions. The software integrates with virtually all business processes and applications, and works with multiple operating systems and databases using customized software for uploading and downloading of necessary information files.

Table 1 shows the preferred means for various means for doing different functions of this invention.

TABLE 1

| | |
|---|---|
| means for generating a receipt and a payment remittance information | Internet, Smart cards, Wireless access device, smart crystals, hand-held display screens, fiber optics, VAN (Value Added Network) database, digital optical readers, digital print readers, broadband network, DVD-ROM, CD-RW, Telecommunication line cord, bio-crystal network, Secure Socket Layers (SSL)-order of magnitude better, keyboard, bar codes, laser scanners, User Interface without Server (UIwS) and computer-executable instructions |
| means for enabling an entity to authorize a payment due on the receipt | Computer instructions, computer generated instructions, VAN (Value Added Network) database, keyboard, Secure Socket Layers (SSL)-order of magnitude better, instructions initiated by a entity, User Interface without Server (UIwS), PPP's (Point-to-Point Protocol), SHTP's (Secure Hypertext Transfer Protocol) and |
| means for associating the payment with the payment remittance information | Computer instructions, computer generated instructions, VAN (Value Added Network) database, instructions initiated by a entity and keyboard |
| means for storing a receipt and a payment remittance information, the payment remittance information comprising a structured remittance data that is kept hidden from an entity | Computer storage disk drive, data crystals, VAN (Value Added Network) database, artificial intelligence, wireless storage networks, smart cards and keyboard |
| means for presenting the receipt to the entity without revealing the structured remittance data;. | Computer storage disk drive, data crystals, VAN (Value Added Network) database, artificial intelligence, Secure Socket Layers (SSL)-order of magnitude better, wireless storage networks, smart cards, ISP's (Internet Service providers), PPP's (Point-to-Point Protocol), SHTP's (Secure Hypertext Transfer Protocol), keyboard and User Interface without Server (UiwS) |
| means for enabling the entity to specify payment instructions comprising at least an amount to be paid on the receipt and an account at a payor from which to draw the amount while prohibiting the entity from altering data contained in the structured remittance data; | Computer storage disk drive, data crystals, VAN (Value Added Network) database, artificial intelligence, smart Secure Sockets Layer (SSSL), wireless storage networks, smart cards, ISP's (Internet Service providers), PPP's (Point-to-Point Protocol), SHTP's (Secure Hypertext Transfer Protocol), keyboard and User Interface without Server (UIwS) |
| means for associating the payment instructions with the structured remittance data; | VAN (Value Added Network) database, SHTP's (Secure Hypertext Transfer Protocol) and keyboard |
| means for transmitting the payment instructions to the payor to initiate payment of the amount; | A computer, a cellular telephone, a portal, a network, Internet, smart cards, VAN (Value Added Network) database, a wireless access device, smart crystals, hand-held display screens, fiber optics, digital optical readers, digital print readers, a broadband network, a DVD-ROM, a CD-RW, a telecommunication line cord, a bio-crystal network, bar codes, data crystals, keyboard, artificial intelligence, laser scanners, Secure Socket Layers (SSL)-order of magnitude better, ISP's (Internet Service providers), PPP's (Point-to-Point Protocol), SHTP's (Secure Hypertext Transfer Protocol), User Interface without Server (UIwS) and computer-executable instructions. |
| means for routing the amount to a payee | VAN (Value Added Network) database, Secure Socket Layers (SSL)-order of magnitude better, keyboard and User Interface without Server (UiwS) |
| means for transmitting the receipt and the payment remittance information to at least an intermediary | A computer, a cellular telephone, a portal, Secure Socket Layers (SSL)~order of magnitude better, a network, Internet, smart cards, a wireless access device, smart crystals, hand-held display screens, fiber optics, digital optical readers, digital print readers, a broadband network, ISP's (Internet Service providers), PPP's (Point-to-Point Protocol), SHTP's (Secure Hypertext Transfer Protocol), a DVD-ROM, a CD-RW, a telecommunication line cord, a bio-crystal network, VAN (Value Added Network) database, keyboard, bar codes, data crystals, artificial intelligence, laser scanners, User Interface without Server (UIwS), keyboard and computer-executable instructions. |
| means for specifying a payment date | Computer storage disk drive, data crystals, artificial intelligence, Keyboard, Secure Socket Layers (SSL)--order of magnitude better, wireless storage networks, smart cards, VAN (Value Added Network) database, PPP's (Point-to-Point Protocol), SHTP's (Secure Hypertext Transfer Protocol), keyboard and User Interface without Server (UIwS) |
| means for designating the payee | Secure Socket Layers (SSL)-order of magnitude better, VAN (Value Added Network) database, SHTP's (Secure Hypertext Transfer Protocol), keyboard and User Interface without Server (UIwS) |
| comprising means for submitting the payment instructions an account clearing house payment system or a credit card processing system | A computer, a cellular telephone, Secure Socket Layers (SSL)-order of magnitude better, a portal, a network, Internet, smart cards, a wireless access device, smart crystals, hand-held display screens, fiber optics, digital optical readers, digital print readers, a broadband network, a DVD-ROM, a CD-RW, a telecommunication line cord, a bio-crystal network, VAN (Value Added Network) database, bar codes, data crystals, artificial intelligence, laser scanners, ISP's (Internet Service providers), PPP's (Point-to-Point Protocol), SHTP's (Secure Hypertext Transfer Protocol), User Interface without Server (UIwS), keyboard and computer-executable instructions. |
| means for transmitting non-billing information with the receipt | A computer, a cellular telephone, a portal, Secure Socket Layers (SSL)~order of magnitude better, a network, Internet, smart cards, a wireless access device, smart crystals, hand-held display screens, fiber optics, digital optical readers, digital print readers, a |

TABLE 1-continued

| | |
|---|---|
| | broadband network, a DVD-ROM, a CD-RW, VAN (Value Added Network) database, a telecommunication line cord, a bio-crystal network, bar codes, data crystals, artificial intelligence, laser scanners, ISP's (Internet Service providers), PPP's (Point-to-Point Protocol), SHTP's (Secure Hypertext Transfer Protocol), User Interface without Server (UIwS), keyboard and computer-executable instructions. |
| means for encrypting the receipt and the payment instructions | Secure Socket Layers (SSL)--order of magnitude better, VAN (Value Added Network) database, keyboard and SHTP's (Secure Hypertext Transfer Protocol) |
| means for digitally signing the receipt | Secure Socket Layers (SSL)-order of magnitude better, VAN (Value Added Network) database, keyboard and SHTP's (Secure Hypertext Transfer Protocol) and User Interface without Server (UiwS) |
| means for authenticating the receipt | Secure Socket Layers (SSL)-order of magnitude better, VAN (Value Added Network) database, keyboard and SHTP's (Secure Hypertext Transfer Protocol) |

Example 1

Figure 1:
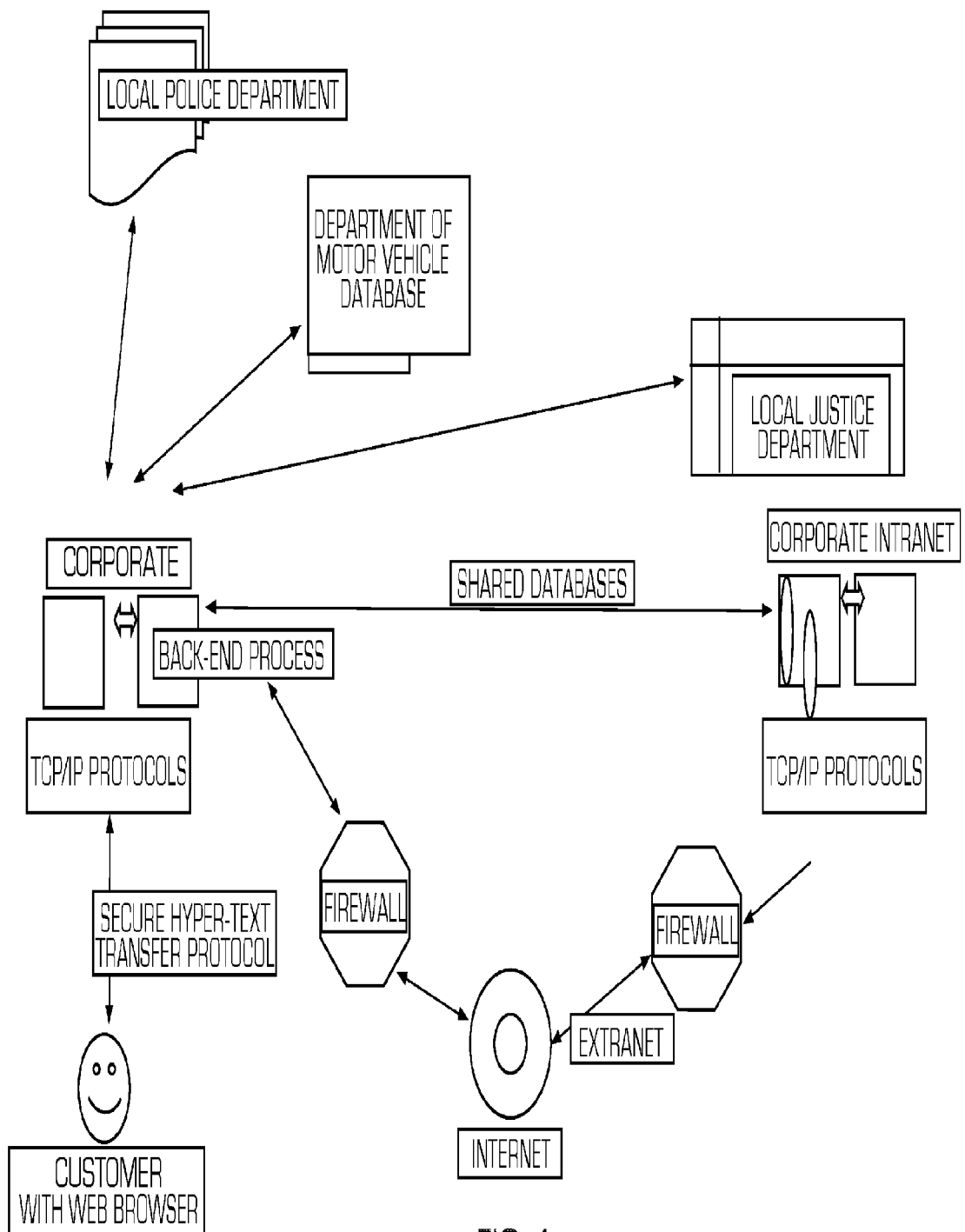
FIG. 1 schematically shows a three-tier system architecture layout for an entity hardware and software design process of conducting transactions associated with Court Tickets, Court Warrants or Court Citations using the Internet and E-commerce.

The following, in conjunction with FIG. 1, describes a typical example of how this system and the process work. A Police Administration Police Administration Citation/Police Administration Ticket is issued. The customer during the next 21 days, using a Web Browser logs into the Corporation system. He/She then enters either the Police Administration Citation Number or License Plate Number or Driver's license Number and email address and City, County, State, of issuance. The Corporation database locates this Police Administration Citation and displays the amount charged by the City, County, State, Village or Township to satisfy this Emergency Police Administration Citation/Administration Ticket. If the customer agrees to pay the amount charged, the Payment options are displayed for them. If no other data has been already loaded into memory for a fast retrieval to be displayed. He/She then enters a valid Credit Card number, Bank routing number and Account number, ATM card number, smart card, or Cyber Cash option. The system then validates this transaction. Upon payment the Corporation database time-stamp's and date-stamp's this voucher and transmits it to the City, County, State, Village or Township where the issuance occurred; it also notifies the state Department of Motor Vehicle of the payment against the Driver's license number. The funds are also transferred at the same time. The customer receives an e-mail that the Police Administration Citation or Emergency Vehicle Ticket has been satisfied.

Step 1: A Police Administration Citation number or the individual License Plate Number or the City, County, State, of issuance or driver license number and e-mail address and a Unique identification number or Birth date are entered, in a encrypted form through a HTTP server into a VAN (Value Added Network) database where a digital signature is created. The Corporate then searches the appropriate databases to locate the necessary information using a Gateway link, for protocol conversion, with firewalls in place for security. If the Police Administration Citation/Ticket has been transferred to the Department of Motor Vehicles, then a Back-end process is invoked and the necessary information is retrieved using an encrypted form through an HTTP server in to the Corporate database.

Step 2. A Police Administration Citation retrieval system is disclosed that improves a database system's response time so that a user's request to view information is serviced quickly. During the time the user spends viewing the displayed information, other information that the user is likely to read or study later is preloaded into memory. If the user does later request this information, this information can be written to the display very quickly because the information need not be retrieved from the database. This system takes advantage of the fact that it is possible to accurately locate the information that the user will request. Adaptive prediction schemes can be employed as an aid in determining what information the user will request from the Department of Motor Vehicle, Office of Police Administration or Judicial Department (Corporate) where the Police Administration Citation was issued.

Step 3: A method for paying your Police Administration Citation over the Internet is comprised by identifying a digital signature to be paid. A payment price for the Police Administration Citation is stated using Secure Sockets Layer (SSL) and said payment identifier, querying a database of Government Entity (E-Government)-defined rules provided by E-government to determine if said ticket is to be paid to said citizen for said price, said E-government-defined rules including prices which are concealed from said citizen. After the stated step, the customer is then asked to enter an amount of payment, if it is different from the stated amount. An authenticated payment request is sent to the Corporate using SSL with encryption. The Corporate decrypts the desired Police Administration Citation number, driver's license number, or License Plate Number and calculates a first cryptographic dollar amount for the encrypted Police Administration Citation. The encrypted digital Police Administration Citation and the first cryptographic dollar amount together with a timestamp and date-stamp are then transmitted to the customer. This information is then decrypted and the customer confirms a second cryptographic dollar amount and Police Administration Citation number which is also encrypted. The customer creates an electronic payment order containing information identifying the transaction, the second cryptographic dollar amount, Police Administration Citation number, City, County, State of issuance, date-stamp and the timestamp. The electronic payment order is transmitted to the Banks and Financial Institutions using CGI script for an authorization request. The Corporate compares the first and second cryptographic checksums to ensure that they match, and if so, the Corporate adds an electronic signature and a decryption key to the electronic payment order. The Corporate submits the Corporate signed electronic payment order and the key to an account server for review. The account server reviews the information in the electronic payment order and sends a message, including the key if the review is positive, to the Corporate. Email Notification—automatically sends email to the customer informing them of the payment of the Police Administration Citation and a confirmation number. The Office of Police Administration/City, County, State, Judicial Department's or Department of Motor Vehicles database is then updated with the necessary information to satisfy the Police Administration Citation issued using the decryption key.

Example 2

Figure 2:
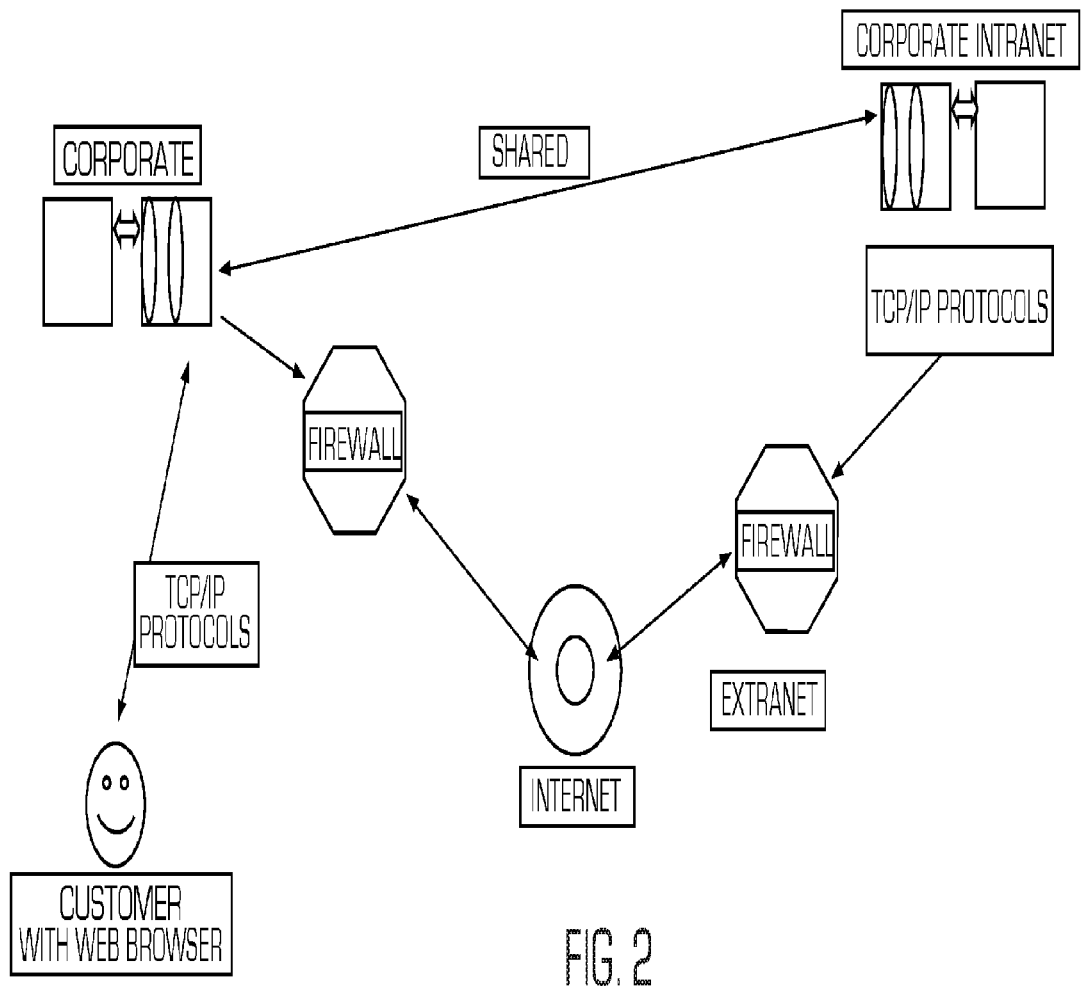
FIG. 2 schematically show a three-tier system architecture layout for an entity hardware and software design process of conducting transactions associated with Traffic Tickets or Citations using the Internet and E-commerce.

The following, in conjunction with FIG. 2, describes a typical example of how this system and the process work. A Citation/Traffic Ticket is issued. The customer during the next 45 days, using a Web Browser, logs into the Corporation system. He/She then enters either the Citation Number or Name, Driver's Ucense Number, Unique identification number or Birth date and City of Citation issued. The Corporation database locates this Citation and displays the amount charged by the City, Village or Township to satisfy this Citation/Traffic Ticket. If the customer agrees, the Payment options are displayed for them. If not other data has been already loaded into memory for a fast retrieval to be displayed. He/She then enters a valid Credit Card number, Bank routing number and Account number, ATM card number, smart card or Cyber Cash option. The system then validates this transaction. Upon payment the Corporation databases time stamps and date-stamps this voucher and transmits it to the City, Village or Township where the issuance occurred. The funds are also transferred at the same time. The customer receives e-mail that the citation/traffic ticket has been satisfied. The City, Village, Township or County receives a notification via email or printer for reconciliation purposes.

Step 1: A citation number or a name or a city of issuance or driver license number or an e-mail address or a Unique identification number or Birth date are entered in a encrypted form through a HTTP server into a VAN database where a digital signature is created. The Corporate then searches the appropriate database to locate the necessary information using a Gateway link, for protocol conversion, with firewalls in place for security.

Step 2. A citation retrieval system is disclosed that improves a database system's response time so that a user's request to view information is serviced quickly. During the time the user spends viewing the displayed information, other information that the user is likely to read or study later is preloaded into memory. If the user does later request this information, this information can be written to the display very quickly because the information need not be retrieved from the database. The invention takes advantage of the fact that it is possible to accurately locate the information that the user will request. Adaptive prediction schemes can be employed as an aid in determining what information the user will request from the Police Department (Corporate) where the citation was issued.

Step 3: A method for paying your citation over the Internet is comprised by identifying a digital signature to be paid. A payment price for the citation is stated using Secure Sockets Layer (SSL) and said payment identifier, querying a database of Government Entity (E-Government)-defined rules provided by E-government to determine if said ticket is to be paid to said citizen for said price, said E-government-defined rules including prices which are concealed from said citizen. After the stated step, the customer is then asked to enter an amount of payment, if it is different from the stated amount. An authenticated payment request is sent to the Corporate using SSL with encryption. The Corporate decrypts the desired citation number, driver's license number, or name and calculates a first cryptographic dollar amount for the encrypted citation. The encrypted digital citation and the first cryptographic dollar amount together with a timestamp and date-stamp are then transmitted to the customer. This information is then decrypted and the customer confirms a second cryptographic dollar amount and citation number, which is also encrypted. The customer creates an electronic payment order containing information identifying the transaction, the second cryptographic dollar amount, citation number, city of issuance, date-stamp and the timestamp. The electronic payment order is transmitted to the Banks and Financial Institutions using CGI script for an authorization request. The Corporate compares the first and second cryptographic checksums to ensure that they match, and if so, the Corporate adds an electronic signature and a decryption key to the electronic payment order. The Corporate submits the Corporate signed electronic payment order and the key to an account server for review. The account server reviews the information in the electronic payment order and sends a message, including the key if the review is positive, to the Corporate. Email Notification—automatically sends email to the customer informing them of the payment of the citation and a confirmation number. The City Police department's database is then updated with the necessary information to satisfy the Citation issued using the decryption key.

Example 3

Figure 3:
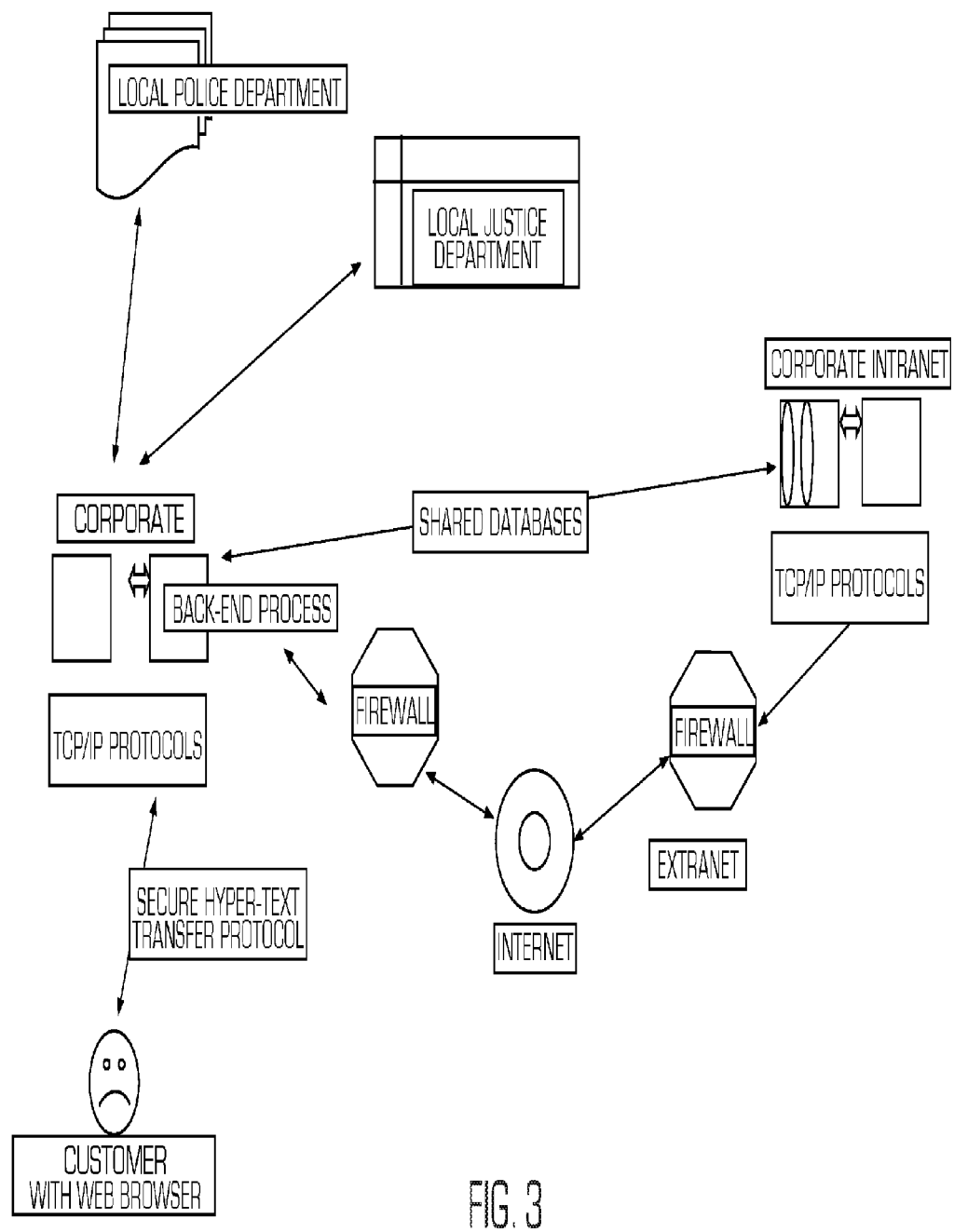
FIG. 3 schematically show a three-tier system architecture layout for an entity hardware and software design process of conducting transactions associated with Emergency Vehicles or Police Administrative Citation using the Internet and E-commerce FIG. 4 schematically show a three-tier system architecture layout for an entity hardware and software design process of conducting transactions associated with Parking Tickets or Parking Citations using the Internet and E-commerce.
Figure 4:
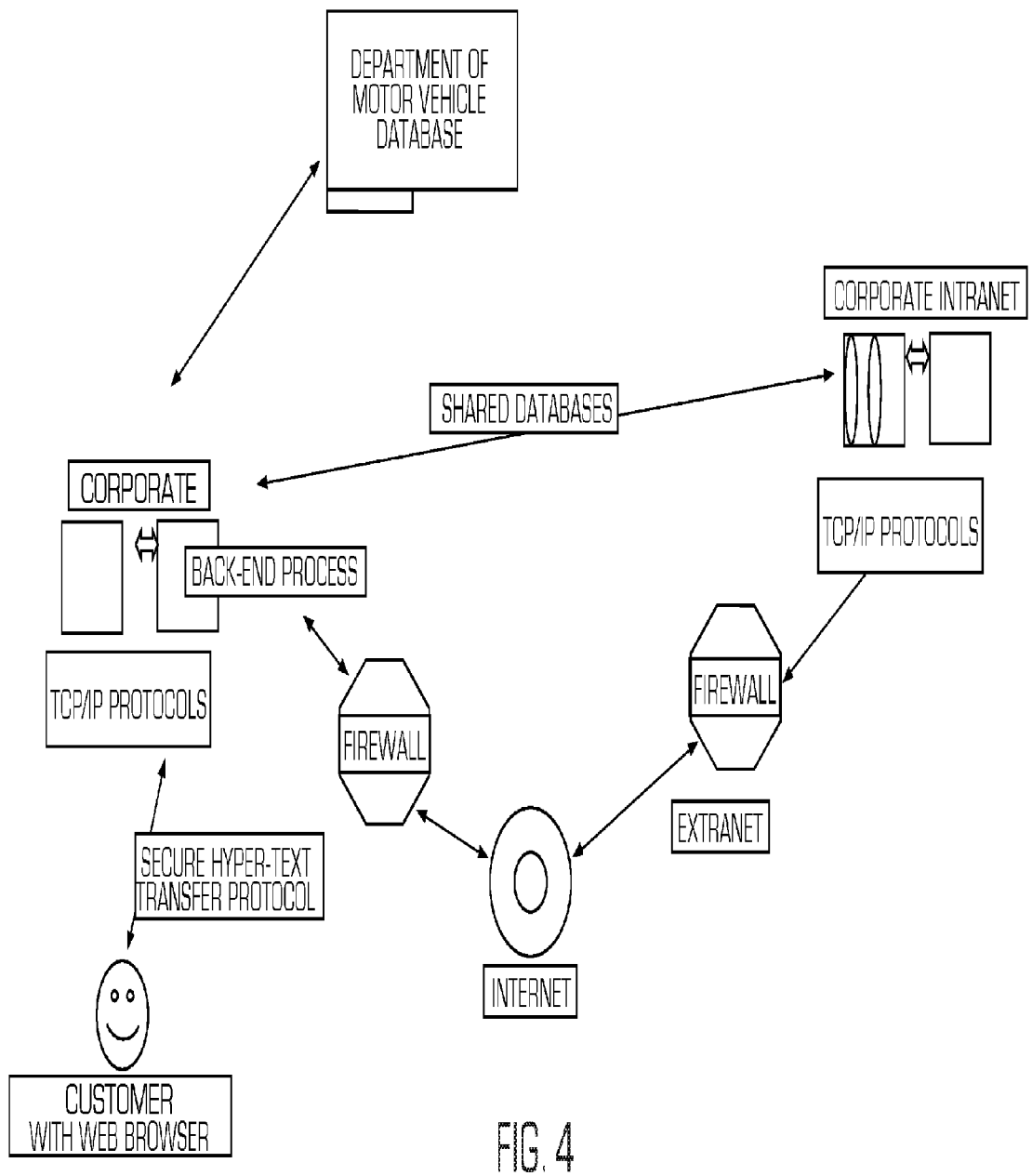

The following, in conjunction with FIG. 3, describes a typical example of how this system and the process work. A Court Tickets/Court Warrant or Court Citation is issued. The customer during the next 21 days, using a Web Browser, logs into the Corporation system. He/She then enters either the Citation Number or Name, Unique identification number or Birth date and City of Citation issued. The Corporation database locates this Citation and displays the amount charged by the State, County, Village or Township to satisfy this Citation, Warrant or Ticket. If the customer agrees to pay the fine charged, the Payment options are displayed for them. If not other data has been already loaded into memory for a fast retrieval to be displayed. He/She then enters a valid Credit Card number or Bank routing number and Account number or ATM card number, smart card or Cyber Cash option. The system then validates this transaction. Upon payment the Corporation database time stamps and date-stamps this voucher and transmits it to the State, County, State, Village or Township where the issuance occurred it also notifies of the Local Police Department if necessary of the payment against the Driver's license number of the individual who received the ticket, warrant or citation. The funds are also transferred at the same time. The customer receives an e-mail that the Citation, Warrant or Ticket has been satisfied.

Step 1: A citation number or the individual name and the City of issuance and driver license number are entered, in a encrypted form through a HTTP server into a VAN (Value Added Network) database where a digital signature is created. The Corporate then searches the appropriate databases to locate the necessary information using a Gateway link, for protocol conversion, with firewalls in place for security. If the Citation, Warrant or Ticket has been transferred to the Police Department, then a Back-end process is invoked and the necessary information is retrieved using a encrypted form through a HTTP server in to the Corporate database.

Step 2. A citation retrieval system is disclosed that improves a database system's response time so that a user's request to view information is serviced quickly. During the time the user spends viewing the displayed information, other information that the user is likely to read or study later is preloaded into memory. If the user does later request this information, this information can be written to the display very quickly because the information need not be retrieved from the database. The system takes advantage of the fact that it is possible to accurately locate the information that the user will request. Adaptive prediction schemes can be employed as an aid in determining what information the user will request from the Police Department, Office of Court of Clerks or Financial Institutions (Corporate) where the citation was issued.

Step 3: A method for paying your citation over the Internet is comprised by identifying a digital signature to be paid. A payment price for the citation is stated using Secure Sockets Layer (SSL) and said payment identifier, querying a database of Government Entity (E-Government)-defined rules provided by E-government to determine if said ticket is to be paid to said citizen for said price, said E-government-defined rules including prices which are concealed from said citizen. After the stated step, the customer is then asked to enter an amount of payment, if it is different from the stated amount. An authenticated payment request is sent to the Corporate using SSL with encryption. The Corporate decrypts the desired citation number, driver's license number, or name and calculates a first cryptographic dollar amount for the encrypted citation. The encrypted digital citation and the first cryptographic dollar amount together with a timestamp and date-stamp are then transmitted to the customer. This information is then decrypted and the customer confirms a second cryptographic dollar amount and citation number, which is also encrypted. The customer creates an electronic payment order containing information identifying the transaction, the second cryptographic dollar amount, citation number, City of issuance, date-stamp and the timestamp. The electronic payment order is transmitted to the Banks and Financial Institutions using CGI script for an authorization request. The Corporate compares the first and second cryptographic checksums to ensure that they match, and if so, the Corporate adds an electronic signature and a decryption key to the electronic payment order. The Corporate submits the Corporate signed electronic payment order and the key to an account server for review. The account server reviews the information in the electronic payment order and sends a message, including the key if the review is positive, to the Corporate. Email Notification—automatically sends email to the customer informing them of the payment of the citation and a confirmation number. The Office of Court Of Clerks/City Judicial Department's or Police Department database is then updated with the necessary information to satisfy the Citation, Warrant or Ticket issued using the decryption key.

Example 4

The following describes a typical example of how this system and the process work. A Parking Citation/Parking Ticket is issued. The customer during the next 21 days, using a Web Browser, logs into the Corporation system. He/She then enters either the Citation Number or Name, Driver's license Number, Unique identification number or Birth date and City of Citation issued. The Corporation database locates this Citation and displays the amount charged by the City, Village or Township to satisfy this Citation/Parking Tickets. If the customer agrees to pay the fine charged, the Payment options are displayed for them. If not other data has been already loaded into memory for a fast retrieval to be displayed, and the option of Drivers Training School is shown with the amount necessary to sign-up for it. He/She then enters a valid Credit Card number, Bank routing number and Account number, ATM card number, smart card or Cyber Cash option. The system then validates this transaction. Upon payment the Corporation database time stamps and date-stamps this voucher and transmits it to the City, Village or Township where the issuance occurred it also notifies the state Department of Motor Vehicle of the payment against the Driver's license number of the individual who received the ticket/citation. The funds are also transferred at the same time. The customer receives an e-mail that the Citation/Parking Tickets has been satisfied.

Step 1: A citation number or the individual name or the City of issuance or driver license number or an e-mail address or a Unique identification number or Birth date are entered, in a encrypted form through a HTTP server into a VAN (Value Added Network) database where a digital signature is created. The Corporate then searches the appropriate databases to locate the necessary information using a Gateway link, for protocol conversion, with firewalls in place for security. If the Citation/Ticket has been transferred to the Department of Motor Vehicles, then a Back-end process is invoked and the necessary information is retrieved using an encrypted form through an HTTP server in to the Corporate database and said payment identifier, querying a database of Government Entity (E-Government)-defined rules provided by E-government to determine if said ticket is to be paid to said citizen for said price, said E-government-defined rules including prices which are concealed from said citizen.

Step 2. A citation retrieval system is disclosed that improves a database system's response time so that a user's request to view information is serviced quickly. During the time the user spends viewing the displayed information, other information that the user is likely to read or study later is preloaded into memory. If the user does later request this information, this information can be written to the display very quickly because the information need not be retrieved from the database. The invention takes advantage of the fact that it is possible to accurately locate the information that the user will request. Adaptive prediction schemes can be employed as an aid in determining what information the user will request from the Department of Motor Vehicle, Office of Parking Violations or Judicial Department (Corporate) where the citation was issued.

Step 3: A method for paying your citation over the Internet is comprised by identifying a digital signature to be paid. A payment price for the citation is stated using Secure Sockets Layer (SSL). After the stated step, the customer is then asked to enter an amount of payment, if it is different from the stated amount. An authenticated payment request is sent to the Corporate using SSL with encryption. The Corporate decrypts the desired citation number, driver's license number, or name and calculates a first cryptographic dollar amount for the encrypted citation.

The encrypted digital citation and the first cryptographic dollar amount together with a timestamp and date-stamp are then transmitted to the customer. This information is then decrypted and the customer confirms a second cryptographic dollar amount and citation number, which is also encrypted. The customer creates an electronic payment order containing information identifying the transaction, the second cryptographic dollar amount, citation number, City of issuance, date-stamp and the timestamp. The electronic payment order is transmitted to the Banks and Financial Institutions using CGI script for an authorization request. The Corporate compares the first and second cryptographic checksums to ensure that they match, and if so, the Corporate adds an electronic signature and a decryption key to the electronic payment order. The Corporate submits the Corporate signed electronic payment order and the key to an account server for review. The account server reviews the information in the electronic payment order and sends a message, including the key if the review is positive, to the Corporate. Email Notification—automatically sends email to the customer informing them of the payment of the citation and a confirmation number. The Office of Parking Violations/City Judicial Department's or Department of Motor Vehicles database is then updated with the necessary information to satisfy the Citation issued using the decryption key.

Example 5

Figure 5:
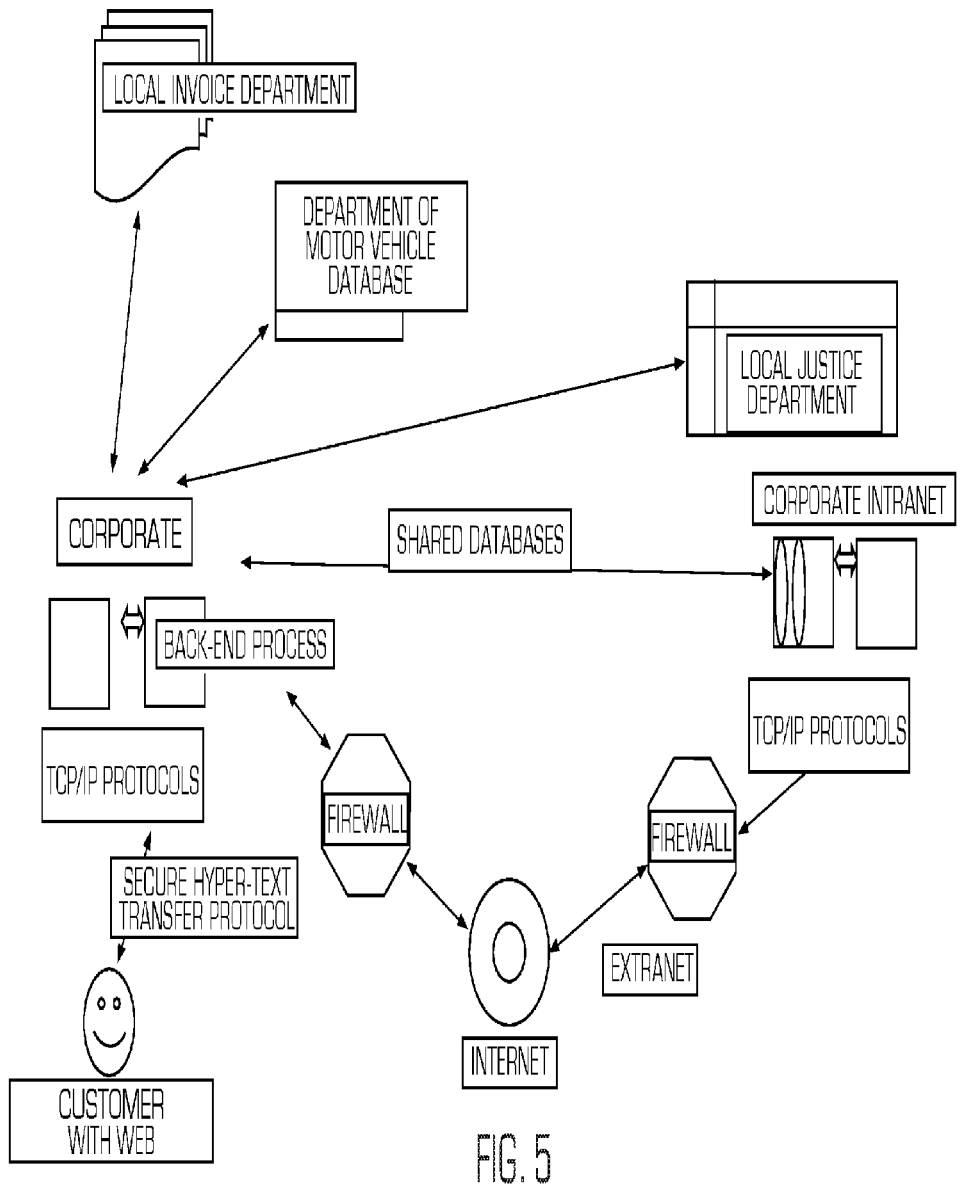
FIG. 5 schematically shows a three-tier system architecture layout for an entity hardware and software design process of conducting transactions associated with Utilities (Water, sewer, property tax and/or Garbage) using the Internet and E-Commerce.

The following, in conjunction with FIG. 5, describes a typical example of how this system and the process work. A invoice is generated, the customer during the next 30 days, using a Web Browser, logs into the City/County/Corporation system. He/She then enters either the invoice number or property address or City or County of issuance and e-mail address. The City/County/Corporation database locates this invoice number and displays the amount charged by the City, County, Village or Township to satisfy this invoice. If the customer agrees to pay the amount charged, the Payment options are displayed for them. If not other data has been already loaded into memory for a fast retrieval to be displayed. He/She then enters a valid Credit Card number, Bank routing number and Account number, ATM card number, smart card or Cyber Cash option. The system then validates this transaction. Upon payment the Corporation database time stamps and date-stamps this voucher and transmits it to the City, County, State, Village or Township where the issuance occurred; it also notifies the state Department of Motor Vehicle of the payment against the Driver's license number. The funds are also transferred at the same time. The customer receives an e-mail that the invoice has been satisfied.

Step 1: A Invoice number or the individual property address and the City, State, are entered, in an encrypted form through a HTTP server into a VAN (Value Added Network) database where a digital signature is created. The Corporate then searches the appropriate databases to locate the necessary information using a Gateway link, for protocol conversion, with firewalls in place for security. If the Invoice has been transferred to the Office for the Court of Clerks, then a Back-end process is invoked and the necessary information is retrieved using an encrypted form through an HTTP server in to the City/County/Corporate database.

Step 2. A Invoice retrieval system is disclosed that improves a database system's response time so that a user's request to view information is serviced quickly. During the time the user spends viewing the displayed information, other information that the user is likely to read or study later is preloaded into memory. If the user does later request this information, this information can be written to the display very quickly because the information need not be retrieved from the database. This system takes advantage of the fact that it is possible to accurately locate the information that the user will request. Adaptive prediction schemes can be employed as an aid in determining what information the user will request from the City/County'Corporation where the Invoice was issued.

Step 3: A method for paying your Invoice over the Internet is comprised by identifying a digital signature to be paid. A payment price for the Invoice is stated using Secure Sockets Layer (SSL) and said payment identifier, querying a database of Government Entity (E-Government)-defined rules provided by E-government to determine if said ticket is to be paid to said citizen for said price, said E-government-defined rules including prices which are concealed from said citizen. After the stated step, the customer is then asked to enter an amount of payment, if it is different from the stated amount. An authenticated payment request is sent to the Corporate using SSL with encryption. The Corporate decrypts the desired Invoice number, property address and calculates a first cryptographic dollar amount for the encrypted Invoice.

The encrypted digital Invoice and the first cryptographic dollar amount together with a timestamp and date-stamp are then transmitted to the customer. This information is then decrypted and the customer confirms a second cryptographic dollar amount and Invoice number, which is also encrypted. The customer creates an electronic payment order containing information identifying the transaction, the second cryptographic dollar amount, Invoice number, City, State of issuance, date-stamp and the timestamp. The electronic payment order is transmitted to the Banks and Financial Institutions using CGI script for an authorization request. The Corporate compares the first and second cryptographic checksums to ensure that they match, and if so, the Corporate adds an electronic signature and a decryption key to the electronic payment order. The Corporate submits the Corporate signed electronic payment order and the key to an account server for review. The account server reviews the information in the electronic payment order and sends a message, including the key if the review is positive, to the Corporate. Email Notification—automatically sends email to the customer informing them of the payment of the and a confirmation number. The Accounting office or other relevant office for the City, County, State database is then updated with the necessary information to satisfy the Invoice issued using the decryption key.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

The invention claimed is:

1. A method for transferring an amount to be paid, comprising:
    searching for available wireless computing devices;
    selecting a payee via input provided through one of the available wireless computing devices;
    selecting a payment option for transferring a payment amount to the payee;
    entering the payment amount via the wireless computing device;
    authorizing payment instructions to the payee through direct communication with an entity maintaining an account of a payor, the authorizing comprising associating the payment amount with payment remittance information arranged within a computer readable data structure, the payment remittance information further comprises a structured remittance data, wherein at least part of the payment remittance information is kept hidden from the payee; and
    receiving confirmation that the payment amount was received by the payee, wherein each method operation is executed through a processor.

2. The method of claim 1, wherein the payment instructions comprise at least an amount to be paid and the account at a payor from which to draw the amount to be paid.

3. The method of claim 1, wherein the payee is prohibited from altering data contained in the payment instructions.

4. The method of claim 1, wherein the direct communication is performed without intervention of the payee.

5. The method of claim 1, wherein at least a portion of the payment instructions is kept hidden from the payor.

6. The method of claim 1, wherein the wireless device is a cellular phone.

7. The method of claim 1, wherein the authorizing comprises:
specifying the payment instructions to include the amount to be paid and the account at a payor from which to draw the amount to be paid.

8. The method of claim 7, wherein the payor is selected from a group consisting of a bank, a user, and a credit card facility.

9. The method of claim 1, wherein the payee is selected from a group consisting of an intermediary, a government agency, a government department, a business, a citizen, and a collection agency.

10. The method of claim 1, wherein the authorizing comprises:
specifying the payment instructions to include the amount to be paid and an account at a payor from which to draw the amount to be paid.

11. The method of claim 10, wherein the payor is selected from a group consisting of a bank, a user, and a credit card facility.

12. A method for transferring an amount to be paid, the method comprising;
locating a gateway link providing access to a database;
selecting a payment option for transferring a payment amount to the payee through a wireless computing device;
entering the payment amount via the wireless computing device;
authorizing payment instructions to the payee, wherein the authorizing is performed without intervention of the payee; and
receiving confirmation through the gateway link that the payment amount was received by the payee, wherein the payee is prohibited from altering data contained in the payment instructions, and wherein each method operation is executed through a processor.

13. The method of claim 12, wherein the payment instructions comprise at least an amount to be paid and an account at a payor from which to draw the amount to be paid.

14. The method of claim 12, wherein the selecting is executed through a cellular phone.

15. The method of claim 12, wherein a least a portion of the payment instructions is kept hidden from the payee.

16. The method of claim 12, wherein at least a portion of the payment instructions is kept hidden from the payor.

17. The method of claim 12, wherein the payee is selected from a group consisting of an intermediary, a government agency, a government department, a business, a citizen, and a collection agency.

* * * * *